United States Patent [19]

Windisch et al.

[11] 4,128,286
[45] Dec. 5, 1978

[54] PORTABLE DISPLAY WALL

[76] Inventors: Robert E. Windisch, 28652 Acacia Glenn, Agoura, Calif. 91301; George R. Hartz, 8131 McNulty Ave., Canoga Park, Calif. 91306

[21] Appl. No.: 823,974

[22] Filed: Aug. 12, 1977

[51] Int. Cl.$^2$ ............................................. A47B 81/00
[52] U.S. Cl. ..................................... 312/234; 312/198; 312/245; 211/86
[58] Field of Search ............... 312/234, 197, 198, 199, 312/245, 107; 211/189, 205, 86, 133

[56] References Cited

U.S. PATENT DOCUMENTS

| 2,013,284 | 9/1935 | Michaud | 312/107 |
| 2,064,056 | 12/1936 | Cookson | 312/107 |
| 2,089,999 | 8/1937 | Greene | 312/245 |
| 2,307,992 | 1/1943 | Calhoun et al. | 312/234 |
| 2,602,252 | 7/1952 | Shinn | 312/234 |
| 3,004,744 | 10/1961 | Wall | 211/133 |
| 3,178,243 | 4/1965 | Dirmeyer | 312/234 |
| 3,572,512 | 3/1971 | Schram | 211/133 |
| 3,655,065 | 4/1972 | Yellin | 312/107 |
| 3,828,937 | 8/1974 | Nash | 312/198 |

FOREIGN PATENT DOCUMENTS 1252873  11/1971  United Kingdom ..................... 312/197

Primary Examiner—Victor N. Sakran
Attorney, Agent, or Firm—William H. Maxwell

[57] ABSTRACT

A knock-down wall adapted to be portable within cases of minimal size and erected into substantial size with facility for the display of graphics and/or articles to be exhibited thereby, characterized by a multiplicity of deeply inset modular panels of "shadow box" form with reinforced margins and the corners thereof coupled in nested relation by supporting leg members, whereby the said panels contiguously compliment each other in a structural planar configuration.

8 Claims, 10 Drawing Figures

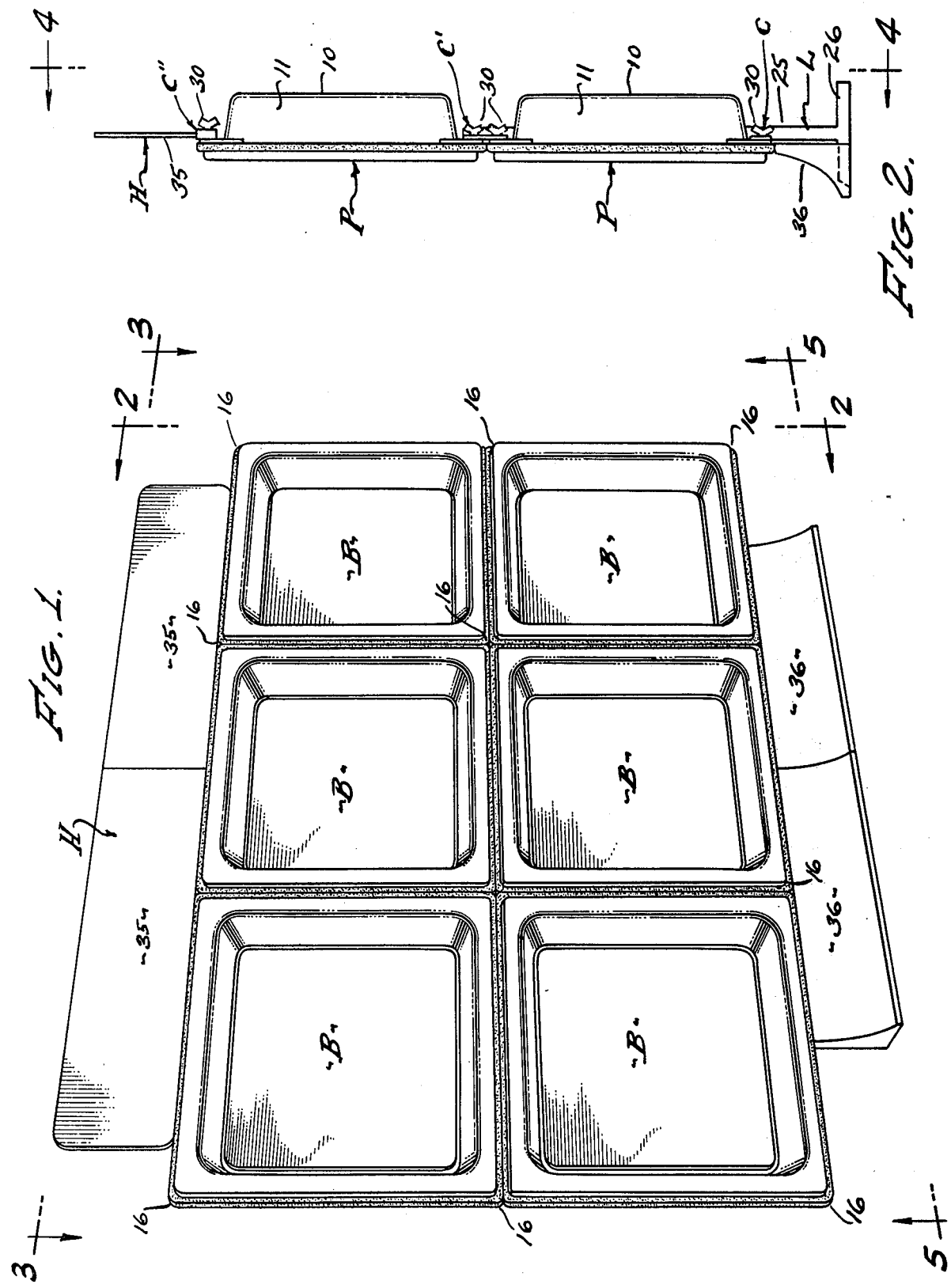

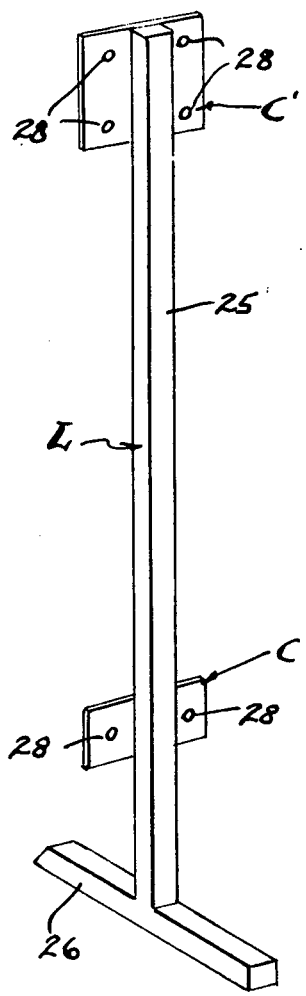
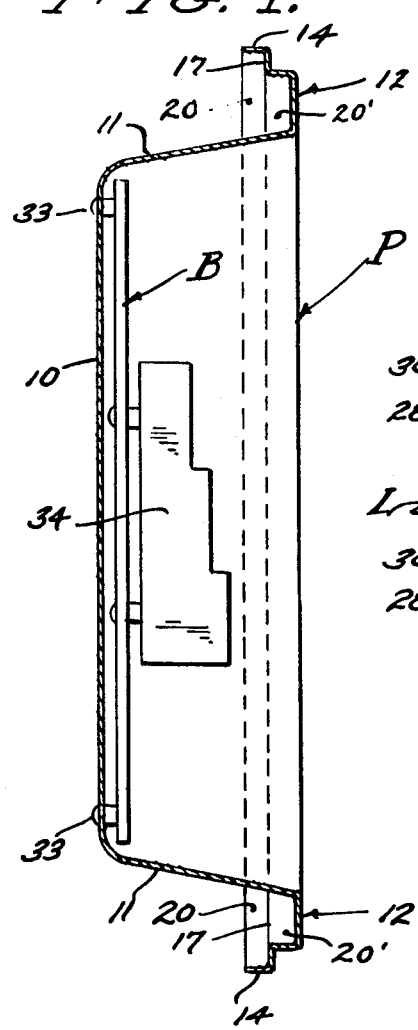
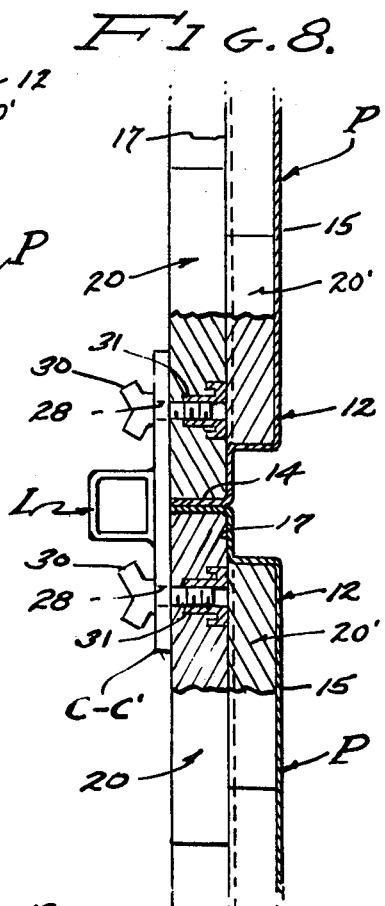
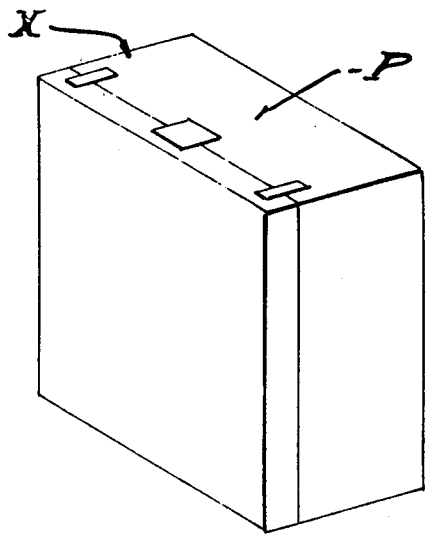
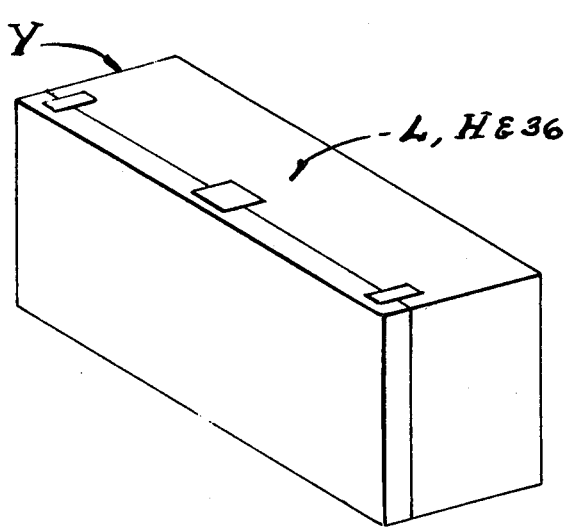

PORTABLE DISPLAY WALL

BACKGROUND

Product display at exhibits or shows and the like is a major problem to manufacturers and/or distributors of goods, who must travel to various exhibition centers and set up for showings on short notice and for limited lengths of time. In practice, booth space is rented for this purpose and the representatives or sales persons are required to travel on tight schedules coordinated with the provision of furnishings that are usually rented and set up immediately preceding the show, all of which is to accommodate the paraphernalia and product to be presented to prospective buyers and/or customers. Heretofore, the logistics have been complicated by the rental of sight unseen furnishings which may or may not be best suited for a particular product, and the timeliness of the installation may be in doubt. Therefore, it is a general object of this invention to provide for portability of a display wall, whereby a sales person can travel with a knock-down display unit customized to his product. Accordingly, it is an object to package this display unit within a traveling case of moderate size, packing a multiplicity of modules of light weight and consequently establishing a shipping case of moderate weight that is easily handled by a person.

Product display involves graphics as well as the presentation of the actual product in article form and/or parts thereof. Art work and related article presentation is therefore of primary concern, and all of which is to be accommodated by the modular panels. Accordingly, it is an object to provide panels with a deep offset for the embracement of the graphics when employed and for the accommodation of the physical products and related articles and parts thereof when they are to be shown. In carrying out this invention, the modular panels are of shadow-box form, each with a planar bottom deeply inset from a marginal frame; the graphics and/or articles for display being on or carried by said bottom, preferably by means of a graphic panel or mounting panel as will be described.

Light weight pannels tend to be flimsy and it is therefore an object of this invention to reinforce the same by means of the perimeter frame thereof which is of continuous channel configuration for the presentation of straight beam sections. It is also an object to compliment the channel section beams at the corners of the frame formed thereby, gussets being fixed thereto at each corner of the modular panel to stiffen the same and to receive the coupling members which cooperatively relate the panels into coplanar wall formation.

The modular panels are alike or identical, and when they are in assembled relation the gussets of juxtaposed panel corners nest together in coplanar relation. It is an object to couple these nested corners, either two or four as required, and to this end coupling plates are provided with fasteners secured to the nested corner gussets. Accordingly there is a single fastener at each modular panel corner to be attached.

The standards or leg members for the assembly of the aforesaid modular panels are tubular members for lightness, and the coupling plates of the center panel and surrounding juxtaposed panels nested thereto are carried by the leg members to be coupled to said nested corners. In this way, the upstanding leg members each supported by a foot, stiffen the frames of the multiplicity of modular panels to hold them coplanar as shown.

Portability is of prime concern, and to this end the modular panels are nestable, so that one panel drops into the next with the marginal frames thereof contiguous one over the other. Therefore, the depth of the case to enclose a multiplicity thereof is of a dimension commensurate with the added thickness of the frame channels plus the depth of one offset bottom; and accordingly it is a simple matter to pack a multiplicity, for example six, of said panels into one case of minimal dimension. Further, the said one offset bottom establishes a chamber for the accommodation of articles such as for example the physical articles to be displayed.

SUMMARY OF THE INVENTION

This invention relates to a knock-down exhibiting structure characterized by a stand comprised of integrated display modules cooperatively joined by leg members so as to stand erect in coplanar wall formation. Lightness is of primary concern, and together with modular construction provides for portability at a minimum weight and size. Size is most important since the display requires maximum size in its erected form, as compared with minimum size for shipping. To these ends a multiplicity of modular panels are cooperatively related to form a display wall, each panel is versatile with respect to its capabilities to show pictorial advertisements or articles such as the products per se; and accordingly the modular panels are deep set "shadow box" units having marginal frames for strength and to embrace the individual panels thereof. The modular panels are thin-walled members, preferably of vacuum formed plastic, all of the same or identical configuration, and substantially rigid so as to compliment each other when cooperatively attached to the supporting leg members. The corners of the modular panels are reinforced for coupling engagement with the leg members and coupling members, all as hereinafter described.

DRAWINGS

The various objects and features of this invention will be fully understood from the following detailed description of the typical preferred form and application thereof, throughout which description reference is made to the accompanying drawings, in which:

FIG. 1 is a perspective front view taken from one end of the portable display wall of the present invention.

FIG. 2 is an end view taken as indicated by line 2—2 on FIG. 1.

FIG. 6 is an enlarged detailed perspective view of one of the leg members.

FIG. 7 is an enlarged sectional view taken through one of the modular panels.

FIG. 8 is an enlarged detailed fragmentary view showing the coupling means, and

FIGS. 9 and 10 are perspective views showing the two typical cases used for transport of the disassembled wall.

PREFERRED EMBODIMENT

Figure 3:
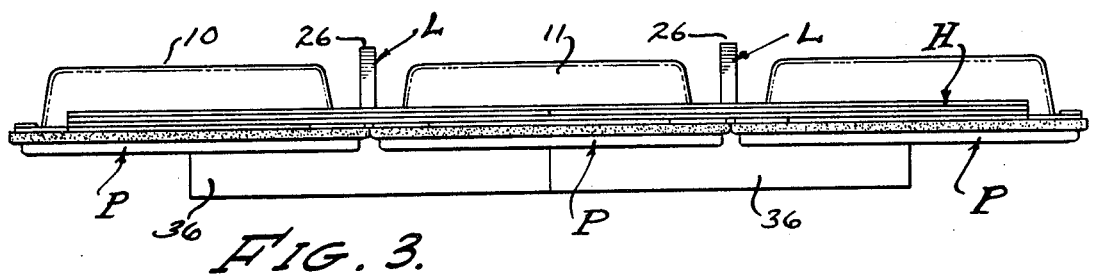
FIG. 3 is a plan view taken as indicated by line 3—3 on FIG. 1.
Figure 4:
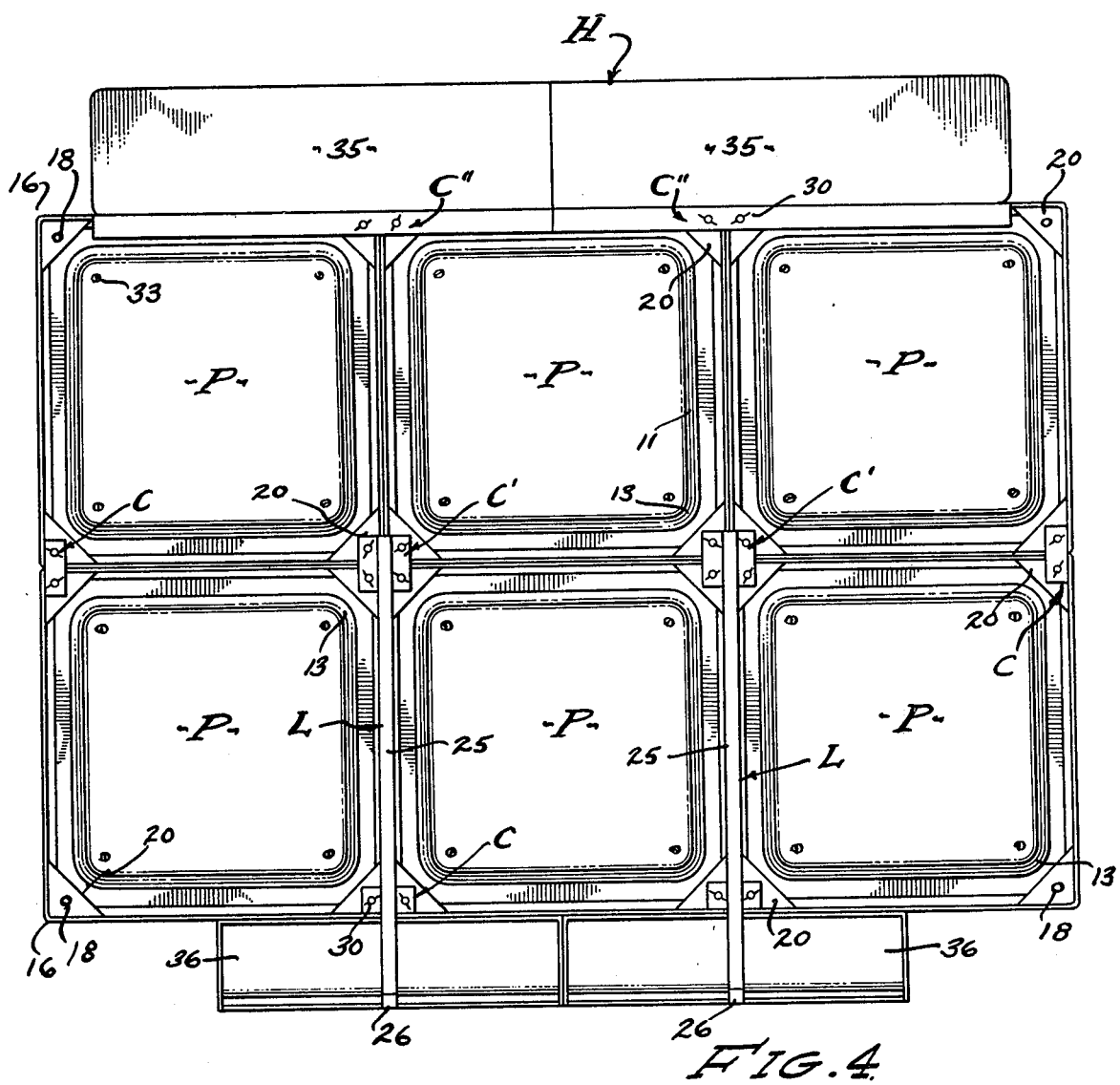
FIG. 4 is a back view taken as indicated by line 4—4 on FIG. 2.
Figure 5:
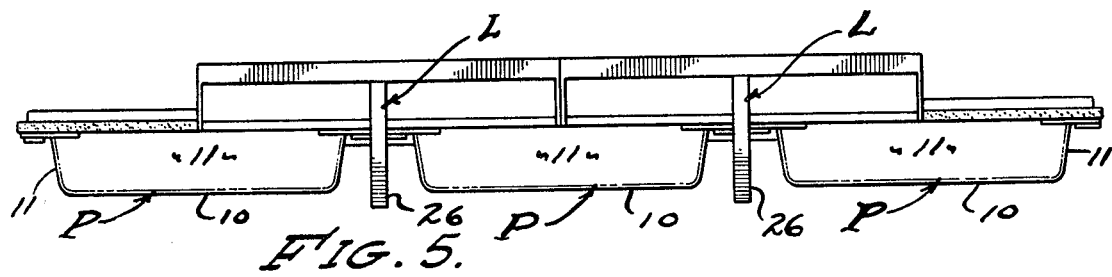
FIG. 5 is a bottom view taken as indicated by line 5—5 on FIG. 1.

Referring now to the drawings, the Portable Display Wall is a knock-down structure comprised of a multiplicity of like and preferably identical modular panels P coupled and supported by leg members L with coupling plates C. In practice, a display wall assembly is two panels in height and at least three panels in width, and with at least a pair of supporting leg members L with coupling plates C connecting the multiplicity of panels together in complimentary coplanar relation. A feature of this invention is the facility with which the modular panels P are assembled and disassembled, and the provision of one or more cases X and Y for shipping in the portable condition. It is preferred that the modular panels are thin walled structures of light weight, for example vacuum formed plastic shells of reinforced configuration, and that the leg members L be light weight metal tubes with coupling plates C fixed thereto in position to join the modular panels P in forwardly faced coplanar nested relation.

The modular panels P are shown fabricated of plastic sheet material vacuum formed into a deeply inset shadow-box configuration comprised of a bottom 10 and four sides 11 with channel-shaped rims 12 continuing one into the other at right angularly related corners 13. The panel member is preferably square, in which case the bottom 10 is of square configuration with the four sides 11 projecting forwardly therefrom, the opposite pairs of sides being divergent 20° (10° per side). The joinder of the bottom with the sides and of the sides at the corners 13 are generously radiused as shown, and to the end that this inset part of one panel module with telescopically nest into the other.

The channel-shaped rims 12 reinforce the forwardly open panel modules by means of a flange 14 turned back from the front face 15 of the rim, thereby establishing a frame that encompasses the panel opening to define an apperature or sight for display. The front faces 15 are coplanar and join at square corners 16 reinforced by gussets 20 bonded into said corners and to the right angularly related flange 14. In practice, the gussets 20 are of triangular form so as to clear the corners 13, and in the preferred form the channeled rim 12 is of substantial depth greater than the thickness of the gussets, in which case the perimeter flanges 14 are shaped into shoulders 17 faced inwardly to receive the gussets to be positioned thereby in coplanar relation one with the other at the inner edges of the flanges 14, respectively. The gussets are made of plywood or the like and there is a fastener opening 18 on the bi-section line of each corner, to secure the couplings later described.

The pair of leg members 11 is adapted to support at least three modular panels P in side by side coplanar relation and preferably at least three vertically disposed pairs of modular panels P in side by side coplanar relation. That is, the front faces 15 of the panels are maintained in coplanar relation, and the panels being identical and of the same depth the bottoms 10 of the panels are also maintained in an inset coplanar relation. In accordance with this invention, the pair of leg members L are positioned to overlie the back side of the adjoining rims of two juxtaposed panels coextensive with the lowermost panels of the vertically disposed pairs thereof. Accordingly, the leg members L are like and preferably identical stands of tube-form comprised of a column 25 projecting upwardly from a horizontal fore and aft foot 26, a T-formation.

The display is elevated above the supporting plane and to this end the columns 25 are longer than the one module length, as much as one and one half said length so as to project from below and above the bottom and top rims 12 to be interconnected. A feature is the coupling plates C and C' that are fixed to the columns at spaced heights to overlie the nested corners of the rims 12 reinforced by the gussets 20, the lowermost plate C overlying the two juxtaposed corners and the uppermost plates C' overlying the four juxtaposed corners. Accordingly, the lower plate has a pair of openings 28 to align with a pair of openings 18 in the gussets of adjoining panels, while the upper plate has two pairs of openings 28 to align with two pairs of openings 18 in the gussets of upper and lower adjoining panels respectively. Consequently, the pair of leg members L, each with upper and lower coupling plates C' and C, interconnect all of the six modular panels P in nested juxtaposed coplanar relation. The remaining four pairs of adjoining corners reinforced by said gussets 20 are also interconnected by separate couplings C, each with a pair of openings 28 to align with a pair of openings 18 in said gussets of the adjoining panels. In carrying out this invention, the couplings C and C' are connected to the panels with releasible wing-studs 30 that penetrate the openings 28 to threadedly engage into nut plates 31 embedded in the gussets 20 to establish the openings 18 therein.

From the foregoing, it will be seen that the basic components of this display are provided in six modular panels P, which can be augmented laterally in vertical pairs thereof connected by an addition leg member L in each instance. In practice, the modular panels P are nominally 3 feet square, in which case the erected basic display is more than 6 feet in height and 9 feet in width. Additionally, a header H comprised of a pair of sign boards 35 of greater length than the modular length, as for example one and one half length as are the leg members, is carried by the uppermost pair of couplings C'', to project in a vertical plane as an extension of the upper rims 12. And, leg covers 36 comprised of a pair of toe rails are vacuum formed as circumstances require to overlie the leg columns 25 and feet 28, and each with end facers to present an embracing enclosure.

Thus, the display is a finished structure as viewed from the front and both ends, the back being utilitarian and exposed accessibly for assembly and for the application of exhibit means and any modification to be applied through the bottom 10 as may be required. As shown, graphic display boards B are releasibly attached to the bottom 10 as by means of corner fasteners 33; said graphic boards being adpated to receive article components 34 as is indicated. The dismantled display is then accommodated in cases X and Y for transport and shipping; for example a case of square configuration to accommodate the telescoped modular panels P nested therein, and a case of rectangular configuration to accommodate the elongated legs member L, header H, and leg covers 36; all of light weight construction and easy to handle and transport as circumstances require.

Assembly of this Portable Display Wall is easily accomplished by removal of the light weight modular components from the cases X and Y; by laying the modular panels P face down in the arrangement desired, and by attaching the leg members L to the nested corner gussets 20 with the coupling plates C and C' fixed thereto with the wing-studs 30 threaded into the nut plates 31. The perimeter coupling plates C are then attached to the remaining nested corner gussets, whereupon the wall is complete and ready for erection and support upon the feet 26. The header H and leg covers 36 are also applied as may be required; and innovation of the graphic display boards B can be customized to the product being exhibited. The modular panels P are also adapted to various other treatment (not shown) such as transparency and/or translucency of bottom 10 with back lighting; and for example picture projection from the rear to be viewed through any one or more of said shadow-box frames. A feature is the stacking of the modular panels P with the graphic display boards B installed thereon; protectively without danger of defacing said boards B. As best illustrated in FIG. 7, the gussets 20 establish blading at the rim 12 in excess of the depth of the board B from bottom 10, in which case the bottom of the internal telescoped panel bottom cannot touch the board B mounted to the bottom of the external telescoped panel module. In practice, the gussets 20 are laminated to underlying blocks 20' that fully occupy the corner configuration and bonded thereto, the thickness of said gusset-blocking provided the protection for said graphic boards B while reinforcing the frame structure of the modular panels P.

Having described only a typical preferred form and application of our invention, we do not wish to be limited or restricted to the specific details herein set forth, but wish to reserve to ourselves any modifications or variations that may appear to those skilled in the art.

We claim:

1. A portable display wall including, a multiplicity of seperable and substantially identical modular panels having rectangular frames for rigidity, the modular panels having means carried within the frames thereof for the reception of graphics and articles for display, there being at least three of said modular panels in side by side relation with the frames thereof nested corner to corner in coplanar relation, at least a pair of leg members and each comprised of a fore and aft foot for support plane engagement and a column extending vertically therefrom to coextensively overlie a line of joinder between adjoining side frame members of adjacent modular panels, and a coupling plate overlying each line of joinder between the upper and lower nested corners respectively and fixed to said column to receive fastener means entered into adjoining side frame members.

2. The portable display wall as set forth in claim 1, wherein the modular panels are of shadow-box configuration having perimeter walls extending convergently from the frame members for nested interengagement of one modular panel with another and an inset bottom comprising said means carried by said perimeter walls for the reception of graphics and articles for display.

3. The portable display wall as set forth in claim 1, wherein the corners of the modular panels are reinforced by gussets secured thereto to engage with said coupling plates and having threaded openings to receive the fastener means threadedly engaged therein without penetrating the nested corners of the frames.

4. The portable display wall as set forth in claim 1, wherein the corners of the modular panels are reinforced by gussets secured thereto to engage with said coupling plates and having threaded openings to receive the fastener means threaded engaged therein without penetrating the nested corners of the frames and securing a header presented a sign board projecting above the upper frame members.

5. A portable display wall of substantial height and including, a multiplicity of seperable and substantially identical modular panels having rectangular frames for rigidity, the modular panels having means carried within the frames thereof for the reception of graphics and articles for display, there being at least three vertically disposed pairs of modular panels in side by side relation with the frames thereof nested corner to corner in coplanar relation, at least a pair of leg members and each comprised of a fore and aft foot for support plane engagement and a column extending vertically therefrom to coextensively overlie a line of joinder between adjoining side frame members of adjacent modular panels, and a coupling plate overlying each line of joinder between the upper and lower nested corners of the vertically disposed pairs of modular panels respectively and fixed to said column to receive fastener means entered into adjoining side frame members.

6. The portable display wall as set forth in claim 5, wherein the modular panels are of shadow-box configuration having perimeter walls extending convergently from the frame members for nested interengagement of one modular panel with another and an inset bottom comprising said means carried by said perimeter walls for the reception of graphics and articles for display.

7. The portable display wall as set forth in claim 5, wherein the corners of the modular panels are reinforced by gussets secured thereto to engage with said coupling plates and having threaded openings to receive the fastener means threadedly engaged therein without penetrating the nested corners of the frames.

8. The portable display wall as set forth in claim 5, wherein the corners of the modular panels are reinforced by gussets secured thereto to engage with said coupling plates and having threaded openings to receive the fastener means threadedly engaged therein without penetrating the nested corners of the frames and securing a header presenting a sign board projecting above the upper frame members.

* * * * *